United States Patent [19]

Blair

[11] Patent Number: 5,670,213

[45] Date of Patent: Sep. 23, 1997

[54] PROCESS FOR INCREASING TORQUE GENERATED BY A CLUTCH

[75] Inventor: Richard L. Blair, Carrollton, Tex.

[73] Assignee: Hilite Industries, Inc., Carrollton, Tex.

[21] Appl. No.: 404,308

[22] Filed: Mar. 14, 1995

[51] Int. Cl.⁶ .................................................. B05D 3/02
[52] U.S. Cl. .................... 427/318; 192/107 M; 252/28; 252/45; 252/46.6; 252/49.3; 427/327; 427/398.1
[58] Field of Search ................... 192/107 M; 252/28, 252/45, 46.6, 49.3; 427/318, 327, 398.1

[56] References Cited

U.S. PATENT DOCUMENTS

| | | | |
|---|---|---|---|
| 3,864,093 | 2/1975 | Wolfla | 29/195 |
| 4,088,583 | 5/1978 | Pyle et al. | 252/85 A |
| 4,138,349 | 2/1979 | Brown, Jr. | 252/49.9 |
| 4,218,494 | 8/1980 | Belmondo et al. | 427/190 X |
| 4,226,914 | 10/1980 | Terner et al. | 428/446 |
| 4,253,714 | 3/1981 | Bhushan | 308/241 |
| 4,406,667 | 9/1983 | Sarin et al. | 51/295 |
| 4,406,668 | 9/1983 | Sarin et al. | 51/295 |
| 4,406,669 | 9/1983 | Sarin et al. | 51/295 |
| 4,406,670 | 9/1983 | Sarin et al. | 51/295 |
| 4,409,003 | 10/1983 | Sarin et al. | 51/295 |
| 4,409,004 | 10/1983 | Sarin et al. | 51/295 |
| 4,416,670 | 11/1983 | Sarin et al. | 51/295 |
| 4,424,066 | 1/1984 | Sarin et al. | 51/295 |
| 4,431,431 | 2/1984 | Sarin et al. | 51/295 |
| 4,436,830 | 3/1984 | Andreev et al. | 501/96 |
| 4,469,489 | 9/1984 | Sarin et al. | 51/295 |
| 4,533,606 | 8/1985 | Teng et al. | 428/658 |
| 4,552,259 | 11/1985 | Albertson | 192/107 M |
| 4,554,201 | 11/1985 | Andreev et al. | 428/215 |
| 4,731,302 | 3/1988 | Weissmantel et al. | 428/698 |
| 4,762,753 | 8/1988 | Perfetti | 428/450 |
| 4,765,917 | 8/1988 | Gratis et al. | 252/42.1 X |
| 4,828,934 | 5/1989 | Pinkhasov | 428/622 |
| 5,034,022 | 7/1991 | Baht et al. | 51/307 |
| 5,198,285 | 3/1993 | Arai et al. | 428/216 |
| 5,249,554 | 10/1993 | Tamor et al. | 123/90.51 |
| 5,266,398 | 11/1993 | Hioki et al. | 428/336 |
| 5,294,355 | 3/1994 | King et al. | 252/49.3 X |
| 5,326,733 | 7/1994 | Mizuno et al. | 501/97 |
| 5,330,794 | 7/1994 | Bosco et al. | 422/387 |

OTHER PUBLICATIONS

MSDS for Tool–Tuff 101, Royal Purple Synthetic Lubricants, Inc., Humble, Texas PS 0404A Jun. 22, 1993.
Product Literature for Tool–Tuff 101, no date provided.

Primary Examiner—Michael Lusignan
Attorney, Agent, or Firm—Reising, Ethington, Barnard & Perry

[57] ABSTRACT

Method for increasing the torque generating capabilities of a clutch are disclosed including the application of a film lubricant composition onto the engagement surfaces of a clutch. The composition imparts anti-galling properties to engaging surfaces of metallic pieces such as brakes or clutches.

19 Claims, 2 Drawing Sheets

500X

Treated lock-up collar-clutch disc depicting powder metallurgy part pores (dark) and absence of any measurable coating at this magnification.

500X

Treated lock-up collar-clutch disc depicting powder metallurgy part pores (dark) and absence of any measurable coating at this magnification.

500X

Untreated lock-up collar-clutch disc depicting powder metallurgy part pores (dark).

PROCESS FOR INCREASING TORQUE GENERATED BY A CLUTCH

FIELD OF THE INVENTION

This invention relates to methods of increasing the torque between surfaces such as that produced by a clutch or brake without increasing the size of them.

BACKGROUND ART

When mating surfaces contact each other, galling may occur, i.e., there is a wearing away of the surface. It is most desirable to utilize techniques which utilize anti-galling compositions which control the friction between the surfaces and the wearing away of the surfaces.

A clutch is a releasable coupling connecting the adjacent ends of two coaxial shafts. It is said to be engaged or, in, when the shafts are coupled, and disengaged, or out, when they are released. A clutch functions to selectively transfer torque from a driving member (input shaft) to a driven member (output shaft).

Clutches are often characterized by the technique utilized to couple the input shaft to the output shaft and/or by the method of actuation. Coupling may be achieved by friction, mechanical engagement, an electromagnetic field, or a combination thereof. The coupling technique often influences the method of actuation which may include mechanical, electric, pneumatic, hydraulic or self-actuation, among others. Thus, electromagnetic clutches are typically electrically actuated due to the nature of the electromagnetic field which couples the driving member to the driven member.

Electromagnetic clutches are primarily utilized in applications requiring variable slip between the input shaft and the output shaft. Rather than using only an electromagnetic field to couple the input shaft to the output shaft, some electromagnetic clutches utilize the attractive force created by the electromagnetic fields to generate a frictional force which couples the driving member to the driven member. These clutches are used in a wide variety of diverse applications including various mobile hydraulic systems such as those found on fishing boats, farm machinery, fire trucks, aerial lifts, and mining equipment, among others. Automotive applications utilize this type of clutch to couple accessories, such as an air-conditioning compressor, to the engine. Regardless of the particular type, electromagnetic clutches have similar principles of operation.

In a vehicle, the basic friction type clutch comprises two discs, one, an engine flywheel and the other, generally the lighter of the two, the presser or pressure plate. The flywheel is bolted to a flange on the end of the crank shaft, while the other plate slides axially on the output shaft, except in as much as a spring or springs tending to press it against the flywheel. Such a clutch is engaged by its spring or springs and disengaged by a pedal-actuated linkage under the control of the driver.

Of particular interest in the present case is the environment of a transfer case used in a modern four-wheel drive vehicle. In that environment, the metallic surfaces are present in an oily hot environment and there is a need for rapid, immediate and repeated engagement of the mating surfaces, e.g., clutch surfaces. Such oils are heavy aromatic oils having a high boiling point or synthetic transmission fluids such as Dexron or Mercon automatic transmission fluid and the like.

Of particular interest, is the method used to generate torque. It is important to mention that there are two types of torque: 1) static torque, the "breakaway" torque required to slip a locked-up clutch; and 2) dynamic torque, which is applied during the period when the surfaces are sliding into engagement.

The present invention is particularly useful in a dynamic torque environment such as that present in a transfer case of a vehicle.

Generally there are three factors that determine the torque capacity of a clutch: 1) attractive engagement force between surfaces; 2) coefficient of friction; and 3) mean radius of the rubbing or friction faces.

If the attractive force that moves the clutch into engagement exerts a force P normal to the discs, that is parallel to their common axis, the frictional force tending to prevent slip is $\mu$ times P where $\mu$ is the coefficient of friction of the rubbing faces. This frictional force is the sum of all of the small forces, each of which is acting at one of the almost infinite number of contact points between the friction faces of the discs.

The resultant friction force is generally taken as acting tangentially at the mean radius, R, of the friction faces which, if they are lined, is usually a relatively narrow annular strip, or ring of pads, of the material having a high coefficient of friction. Consequently, the torque, Q, that is F×R, about the axis of the plates can be expressed most simply as $\mu \times P \times R$.

Initially the axial force pressing the disks together is too small for the tangential frictional force to overcome the resistances to rotation of the driven shift, so there is slip at the friction faces, the relative velocity between which reduces until it becomes zero at the instant of full engagement.

While the maximum torque a clutch can transmit is dependent upon the mean radius of the annulus of friction material, its rate of wear is determined by the area of that annulus. Consequently, although it is desirable to make both the inside and outside diameters of the annulus as large as practicable, if the inside diameter is too large, the area of the annulus will be too small to obtain an acceptable rate of wear.

The force between surfaces and contacts, force of friction, depends upon several factors. The first is the materials of which the surfaces are composed. The second factor is the condition of the surfaces, whether rough, smooth or polished, clean or dirty, dry or oily. The third factor is the force acting between the surfaces and contact, but it is only the force perpendicular to the surface that affects the friction. This perpendicular force between the surfaces is called the normal force.

The frictional force may be expressed in terms of the normal force, and a quantity that depends upon the kind and condition of the surfaces, the coefficient of friction, $\mu$. Thus F (force of friction) equals $\mu$ (coefficient of friction) times P (normal force). These mechanical formulas demonstrate the relationship between the coefficient of friction and the torque produced by a clutch. As per the mathematical relationship, the torque capacity of a clutch can be increased by decreasing the coefficient of friction between the engaging surfaces or discs of the clutch.

One can decrease the coefficient of friction by utilizing an anti-galling composition, thereby decreasing excessive wear of the engaging surfaces.

Increasing the torque transmitting capabilities of a clutch has been a subject of indepth experimentation and testing as a result of the demand for higher torque production.

Moreover, an increase in torque could possibly prevent clutch slipping problems, as the clutch would not slip if it transmitted more torque than its load.

In the past, the following methods have been applied to the engagement surfaces in an unsuccessful effort to increase the dynamic torque, (1) concave, (2) machine turned, (3) plasma coating with a thin hard metal, (4) nitriding, (5) ion nitriding, (6) Teflon (trademark of DuPont for (polytetrafluoroethylene) coating, (7) copper infiltrate, (8) heat treating methods, (9) surface finish, (10) surface patterns. In addition, the following design methods have also been attempted: (1) including a larger diameter coil assembly winding wire, (2) increased magnetic flow areas, (3) multiple 6 pole clutch, (4) multiple disk clutch, (5) increase the envelope, diameter and length of the clutch assembly, (6) powdered metal housing and coil ring, (7) reduced tolerances and clearance between magnetic flux carriers, (8) a step in the face of the engagement surface.

Lubricants have been suggested as a means of reducing the coefficient of friction and thus increasing the torque produced by a clutch. A lubricant primarily serves two purposes: one, to reduce the resistance to relative motion between two surfaces and contact under pressure and two, to reduce wear of the surfaces.

In the absence of a lubricant, the coefficient of friction is high and fairly constant, and depends on the materials and fineness of finish, since there is actual contact between the two engaging surfaces. In contrast, with "boundary friction", some lubricant is present between the two engaging surfaces but not sufficient to completely separate the surfaces. Under boundary friction, the coefficient of friction is reduced, but the resistance to motion is still dependent on the load and the nature of the surfaces.

A third type of friction is fluid friction, where the lubrication is force-fed such that it is possible for the engaging surfaces to be completely separated by the lubricant. In these circumstances the resistance to movement is caused by the viscosity, or resistance to shearing of the fluid itself. With most clutch surfaces, the friction conditions fall between boundary and fluid conditions.

While oils are generally used as a lubricating fluid, oils differ considerably in their lubricating quality depending on the surrounding conditions. Animal and vegetable oils, such as sperm, rape and castor, are somewhat superior to mineral oils in the maintenance of a film at high pressures and low speeds. Oils, however, suffer from the tendency to gum at high temperatures.

Another problem associated with the use of oil as a lubricant, is that the viscosity of the oil itself is a source of resistance, which in certain circumstances may make the total resistance with lubrication greater than without any lubrication. Moreover, in order for the resistance to motion, between the engaging surfaces, to be minimized, the oil film should have considerable thickness while having a low viscosity. These conditions are mutually exclusive, since it is not possible to confine a thin oil in a manner to maintain a thick film. In general, oil lubricants have several shortcomings when used for clutch applications.

There is accordingly no commercially viable method for decreasing the coefficient of friction of a clutch such that it is capable of producing an increase in torque. While the use of oil lubricants has proved useful, there still remains a need for a process which effectively increases the torque capability of a clutch without having to increase the size of the clutch.

DISCLOSURE OF THE INVENTION

It is an object of the present invention to provide a process for increasing the level of dynamic torque generated by engaging surfaces such as a clutch or brake through the use of an ionic film.

Another object of the present invention is to provide a clutch assembly that generates increased levels of torque and which does not require a corresponding increase in the size of the clutch.

A further object of the present invention is to provide a process which increases the wear resistance of the engagement surfaces of a clutch using a film lubricant composition.

A still further object of the present invention is to provide a process for lowering the coefficient of friction of the engaging surfaces of a clutch such that it is capable of producing an increase in torque.

It is a further object of the invention to provide a process for increasing the level of dynamic torque generated by engaging surfaces such as a clutch or brake by applying an anti-galling composition to the surfaces, particularly those present in a transfer case of a vehicle.

In carrying out the above objects and other objects and features of the present invention, a process is provided for increasing the torque generating capabilities of a clutch by applying an ionic film lubricant composition onto the engagement surfaces of the clutch which acts to reduce the coefficient of friction between the engagement surfaces.

The above objects and other objects, features and advantages of the present invention will be readily appreciated by one of ordinary skill in the art from the following detailed description of the best mode for carrying out the invention when taken in connection with the accompanying drawings.

BEST MODE FOR CARRYING OUT THE INVENTION

The disclosed film lubricant composition reduces the coefficient of friction between the engaging surfaces of the clutch and thereby increases the torque production capabilities for a particular clutch. More specifically, an ionic film solution is applied to the engaging surfaces to effectuate a reduction in the coefficient of friction and improve resistance to corrosion, galling, wear and stress corrosion cracking between the two engaging surfaces.

It is preferred that the film lubricant composition include a sulfate, an alkali metal silicate and a phosphate. The alkali metal silicate can be chosen from the following: sodium silicate, potassium silicate and lithium silicate. The film lubricant composition also preferably includes nitrogen, water, and acetic acid.

Although not wishing to be bound by any particular theory, it is believed that the silicates and sulfates when used within the film lubricant composition and applied onto the engagement surfaces of the clutch, may form a glassy, greasy lubricating surface which greatly lowers the coefficient of friction.

It is also believed, that as the temperature increases, a glassy film forms on the surface of the engagement surface which aids in keeping the engagement surface and edges smooth and hard, increasing the wear resistance of the engagement surfaces. The addition of alkali metal acetate within the film lubricant composition acts to buffer the surfaces and neutralize excess alkalinity. As temperature increases during the generation of friction, the acetate slowly decomposes forming acetic acid, carbon dioxide, and water which acts to lower the surface temperature and assist to some degree in the glassy surface formation with the silicates.

The film lubricant composition may further, include phosphates which acts as a surfactant and corrosion inhibiter, forming a film of ferrous phosphate. The film lubricant composition may also include water soluble polymeric materials which are believed to interact to increase lubricity and strengthen the coating on the engagement surfaces. While a variety of polymeric materials may be used, such as acrylates, epoxies or polyamides, most preferred are acrylates and even more preferably polyacrylate/polyacrylamide copolymer. All of the plastic materials preferably should be stable at the operating environmental temperatures.

A preferred film lubricant is sold by the trade name Tool-Tuff 101, a water-based ionic solution that is a product of Royal Purple Synthetic Lubricants, Inc. Although Tool-Tuff was formulated for use on cutting tools, this lubricant works effectively on clutch engagement surfaces to reduce the coefficient of friction.

Figure 1:
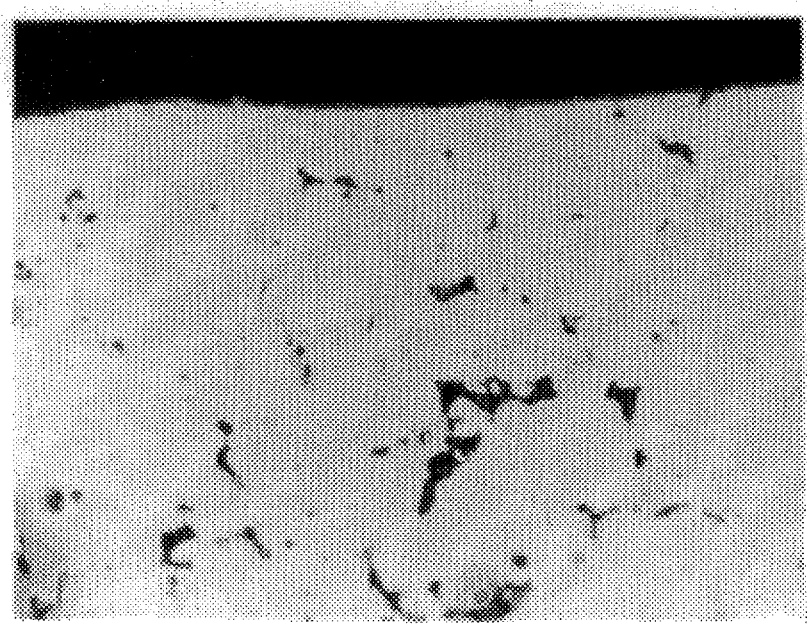
FIG. 1 is a picture of clutch discs treated according to the inventive process.
Figure 2:
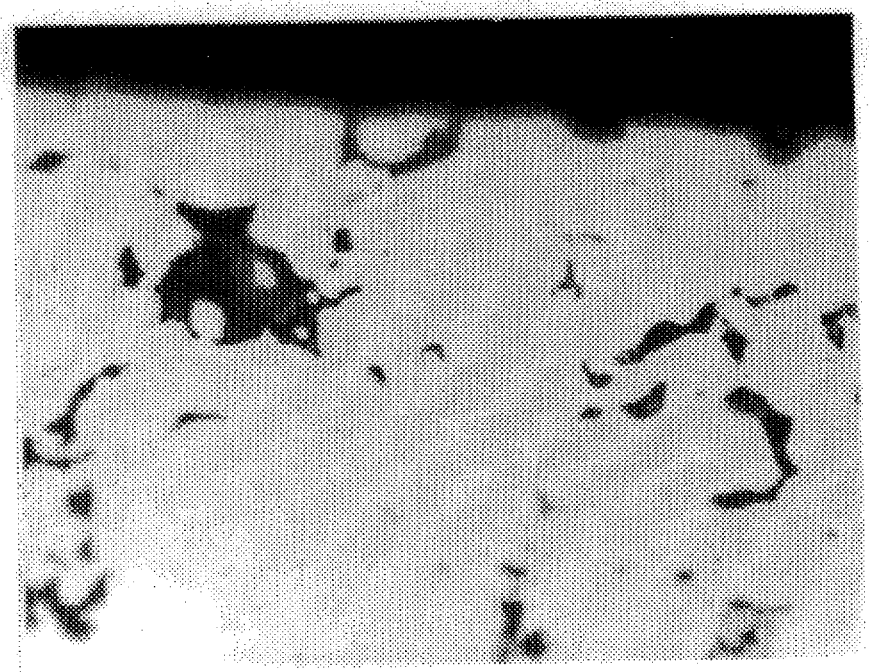
FIG. 2 is a picture of clutch discs not treated by the inventive process.

In general, it is believed that the film lubricant composition impregnates voids within the engagement surfaces of the clutch, providing a continuous lubricating film between the engagement surfaces. FIG. 1 and FIG. 2 depict the untreated and treated lock-up collar-clutch discs that were sectioned and prepared from a metallographic evaluation that was conducted. The clutch discs that were treated included an application of a film lubricant, specifically Tool-Tuff 101. In FIG. 1, the dark area represents pores which resulted from the powdered metallurgy experiments conducted on the untreated lock-up collar-clutch disks. In FIG. 2, the same powder metallurgical experimentation depicts a significant reduction in the pores present within the treated lock-up collar-clutch disk in an absence of any measurable coating at this magnification.

Preferred compositions of anti-galling materials are depicted in Table 1. The pH is preferably alkaline (10–14), preferably 12–13, the composition preferably has a specific gravity of 1.31.

TABLE 1

ANTI-GALLING COMPOSITION

| MATERIALS | RANGE (% by wt.) | PREFERRED (% wt.) |
|---|---|---|
| Alkali-hydroxide | 5–20% | 10% |
| Alkali sulfate | 0.5–5% | 1% |
| Alkali phosphate | 5–20% | 12–14% |
| Alkali silicate | 5–20% | 13–15% |
| Polymeric water soluble material | 5–15% | 9–10% |
| Water | 40–60% | 51–53% |
| TOTAL | 100% | 100% |

Much experimentation has been conducted to increase the dynamic torque above previous levels as is commonly known in the clutch design and manufacturing industry. If one compares dry metal to metal surfaces with surfaces saturated with oil, the torque produced with dry surfaces is reduced up to 25%. This reduction of torque is due to the increase in coefficient of friction with the dry surfaces. However, previously known lubricants have several shortcomings. Accordingly, the present invention provides a method to increase dynamic torque without increasing the clutch size, that is, diametric and overall length of the clutch.

One method to solve this problem is to eliminate or reduce substantially the galling or rough surface created by a full slip of the clutch which further reduces the coefficient of friction and increases the generated torque. Application of the disclosed film lubricant composition greatly improves the torque generating capabilities and prolongs the increase in torque over a longer period of time.

The primary benefit of applying the disclosed film lubricant composition is that the film lubricant composition can be easily applied to the engagement surfaces of the clutch at a very low cost.

It is preferable that the film lubricant composition is applied to the engaging surfaces typically by brushing, spraying, dipping or rubbing by hand.

The engagement surfaces are preferably clean before application of the coating thereon. Accordingly, the preferred method of application includes cleaning at least one of the engagement surfaces of the clutch followed by applying the film lubricant composition onto the engagement surfaces of the clutch. The engagement surfaces are preferably cleaned with a cleanser selected from the group of cleansers consisting of soap, oil free degreasers and oil free solvents.

Another preferred variation of the method includes cleaning at least one of the engagement surfaces followed by heating at least one of the engagement surfaces to approximately 200° F. and then applying the film lubricant composition thereon. Before the engagement surfaces are actually brought into engagement it is preferred that the surfaces are appropriately cooled.

Additionally, the preferred process includes engaging the engagement surfaces and applying coolant on the engagement surfaces. The coolant is preferably applied at least one minute after the surfaces are engaged.

Another preferred method includes: washing the engagement surfaces of the clutch; drying the engagement surfaces; submerging the engagement surfaces in the film lubricant composition; cooling the engagement surfaces; and drying the engagement surfaces.

It should be understood that while the forms of the invention herein shown and described include the best mode contemplated for carrying out the invention, they are not intended to illustrate all possible forms thereof. It will also be understood that the words used are descriptive rather than limiting, and that various changes may be made without departing from the spirit and scope of the invention discussed.

What is claimed is:

1. A process for increasing the torque of metallic surfaces that engage, comprising:

applying a film lubricant composition onto the engagement surfaces of the clutch, said film lubricant composition comprises a sulfate, an alkali metal silicate and a phosphate; and engaging the surfaces thereby increasing the torque of the metallic surfaces, wherein the film lubricant is an anti-galling composition comprised of the following components:

| | |
|---|---|
| alkali-hydroxide | 5–20% by weight |
| alkali sulfate | 0.5–5% |
| alkali phosphate | 5–20% |
| alkali silicate | 5–20% |
| a polymeric water soluble material | 5–15% |
| water | 40–60% |
| | 100% |

2. The process of claim 1, wherein said alkali metal silicate is selected from the group consisting of sodium silicate, potassium silicate and lithium silicate.

3. The process of claim 1, wherein said lubricant composition further includes acetic acid.

4. The process of claim 1 wherein the composition has a pH of 10–14.

5. The process of claim 1 wherein the composition is comprised of the following components:

| | |
|---|---|
| alkali-hydroxide - | 10% |
| alkali sulfate - | 1% |
| alkali phosphate - | 12–14% |
| alkali silicate - | 13–15% |
| a polymeric water soluble material - | 9–10% |
| water | 51–53% |
| | 100%. |

6. The process of claim 1 wherein the composition is further comprised of aqueous soluble polymeric compounds.

7. The process of claim 6 wherein the polymeric compound is comprised of a polyacrylate.

8. The process of claim 1 wherein the clutch is present in an oily substance.

9. A process for increasing the torque of a clutch having engagement surfaces, comprising:

cleaning at least one of the engagement surfaces of the clutch;

heating the engagement surfaces;

applying a film lubricant composition onto the engagement surfaces of the clutch, said film lubricant composition further comprises a sulfate, an alkali metal silicate and a phosphate; and cooling the engagement surfaces, wherein the film lubricant is an anti-galling composition comprised of the following components:

| | |
|---|---|
| alkali-hydroxide | 5–20% by weight |
| alkali sulfate | 0.5–5% |
| alkali phosphate | 5–20% |
| alkali silicate | 5–20% |
| a polymeric water soluble material | 5–15% |
| water | 40–60% |
| | 100% |

10. The process of claim 9 wherein the composition has a pH of 10–14.

11. The process of claim 9 wherein the engagement surface is cleaned with a cleanser selected from the group of cleansers consisting of soap, oil free degreasers and oil free solvents.

12. The process of claim 9 wherein the engagement surfaces are heated to 200° F.

13. The process of claim 9 including the additional steps of engaging the engagement surfaces and applying coolant on the engagement surfaces.

14. The process of claim 13 wherein said coolant is applied at least one minute after the surfaces are engaged.

15. The process of claim 9 wherein the composition is comprised of the following components:

| | |
|---|---|
| alkali-hydroxide - | 10% |
| alkali sulfate - | 1% |
| alkali phosphate - | 12–14% |
| alkali silicate - | 13–15% |
| a polymeric water soluble material - | 9–10% |
| water | 51–53% |
| | 100%. |

16. The process of claim 9 wherein the composition is further comprised of aqueous soluble polymeric compounds.

17. The process of claim 16 wherein the polymeric compound is comprised of a polyacrylate.

18. A process for increasing the torque of a clutch having engagement surfaces comprising:

washing the engagement surfaces of the clutch;

drying the engagement surfaces;

submerging the engagement surfaces in a film lubricant, said film lubricant composition further comprises a sulfate, an alkali metal silicate and a phosphate;

cooling the engagement surfaces; and drying the engagement surfaces, wherein the film lubricant is an anti-galling composition comprised of the following components:

| | |
|---|---|
| alkali-hydroxide | 5–20% by weight |
| alkali sulfate | 0.5–5% |
| alkali phosphate | 5–20% |
| alkali silicate | 5–20% |
| a polymeric water soluble material | 5–15% |
| water | 40–60% |
| | 100% |

19. The process of claim 18 wherein the composition is comprised of the following components:

| | |
|---|---|
| alkali-hydroxide - | 10% |
| alkali sulfate - | 1% |
| alkali phosphate - | 12–14% |
| alkali silicate - | 13–15% |
| a polymeric water soluble material - | 9–10% |
| water | 51–53% |
| | 100%. |

* * * * *